(12) United States Patent
Mantell et al.

(10) Patent No.: US 8,384,971 B2
(45) Date of Patent: Feb. 26, 2013

(54) SYSTEM AND METHOD FOR RENDERING IMAGE VALUES TO BE PRINTED IN A SINGLE PASS BY SERIALLY ARRANGED PRINTHEADS

(75) Inventors: David Allen Mantell, Rochester, NY (US); Jeffrey J. Folkins, Rochester, NY (US); James R. Larson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 12/251,102

(22) Filed: Oct. 14, 2008

(65) Prior Publication Data

US 2010/0091347 A1   Apr. 15, 2010

(51) Int. Cl.
*H04N 1/46* (2006.01)

(52) U.S. Cl. ............... 358/515; 347/13; 347/14; 347/19; 347/41

(58) Field of Classification Search ................ 347/5, 14, 347/15, 19, 61, 237, 240; 358/1.17, 1.9, 358/1.6, 515, 517
See application file for complete search history.

(56) References Cited

U.S. PATENT DOCUMENTS

| | | | | |
|---|---|---|---|---|
| 5,369,419 A | * | 11/1994 | Stephenson et al. ............ | 347/61 |
| 5,739,841 A | * | 4/1998 | Ng et al. ........................ | 347/237 |
| 5,818,501 A | * | 10/1998 | Ng et al. ........................ | 347/240 |
| 5,914,744 A | * | 6/1999 | Ng ................................. | 347/237 |
| 5,933,539 A | | 8/1999 | Metcalfe et al. | |
| 6,290,330 B1 | * | 9/2001 | Torpey et al. ................... | 347/43 |
| 6,428,143 B2 | * | 8/2002 | Irihara et al. ................... | 347/43 |
| 6,561,610 B2 | * | 5/2003 | Yamasaki et al. .............. | 347/15 |
| 6,751,358 B1 | | 6/2004 | Mantell et al. | |
| 6,857,718 B2 | * | 2/2005 | Moriyama et al. ............. | 347/14 |
| 7,095,530 B2 | | 8/2006 | Mantell et al. | |
| 7,198,345 B2 | * | 4/2007 | Shibata et al. ................. | 347/15 |
| 7,262,885 B2 | | 8/2007 | Yao | |
| 7,396,098 B2 | * | 7/2008 | Kanematsu et al. ........... | 347/15 |
| 2002/0070998 A1 | * | 6/2002 | Bloomberg ..................... | 347/41 |
| 2003/0193532 A1 | * | 10/2003 | Moriyama et al. ................ | 347/5 |
| 2006/0209110 A1 | * | 9/2006 | Vinas et al. ..................... | 347/13 |
| 2007/0120883 A1 | * | 5/2007 | Tsuboi ............................ | 347/14 |
| 2007/0153046 A1 | * | 7/2007 | Kanematsu et al. ........... | 347/19 |

* cited by examiner

*Primary Examiner* — Marivelisse Santiago Cordero
*Assistant Examiner* — Moustapha Diaby
(74) *Attorney, Agent, or Firm* — Maginot, Moore & Beck, LLP

(57) ABSTRACT

A method processes image data for a color separation to reduce visible perception of misalignment of printheads in a plurality of serially arranged printheads. The method includes detecting cross-process edges in image values for objects in a color separation to be printed by a plurality of serially arranged printheads, and disproportionately mapping image values corresponding to the object in the color separation to one of the printheads in the plurality of serially arranged printheads.

5 Claims, 3 Drawing Sheets

SYSTEM AND METHOD FOR RENDERING IMAGE VALUES TO BE PRINTED IN A SINGLE PASS BY SERIALLY ARRANGED PRINTHEADS

TECHNICAL FIELD

This disclosure relates generally to imaging devices that eject ink from inkjets onto an image substrate and, more particularly, to imaging devices that have multiple printheads from which ink is ejected to form a color separation on a single pass of an image receiving member.

BACKGROUND

Drop on demand inkjet technology for producing printed media has been employed in commercial products such as printers, plotters, and facsimile machines. Generally, an inkjet image is formed by selectively ejecting ink drops from a plurality of drop generators or inkjets, which are arranged in a printhead or a printhead assembly, onto an image substrate. For example, the printhead assembly and the image substrate are moved relative to one other and the inkjets are controlled to emit ink drops at appropriate times. The timing of the inkjet activation is performed by a printhead controller, which generates firing signals that activate the inkjets to eject ink. The image substrate may be an intermediate image member, such as a print drum or belt, from which the ink image is later transferred to a print medium, such as paper. The image substrate may also be a moving web of print medium or sheets of a print medium onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form that is delivered to a melting device, which heats the solid ink to its melting temperature to generate liquid ink that is supplied to a print head.

In some of these imaging devices, multiple printheads form an image as the image substrate passes the printheads only once. For example, a web of paper moving past a plurality of printheads receives the ink ejected from the printheads and then moves to a web heater and/or fixer for further treatment of the image. The multiple printheads may be arranged in a serial manner to provide an appropriate density of pixels per unit of linear measurement for a particular color. For example, two printheads may be arranged vertically in the direction of the web movement with each printhead having 300 inkjets per inch in each row of inkjets in the printhead. By offsetting the second printhead from the first printhead by a half-width of a single inkjet, the pair of printheads forms rows of printed pixels at a density of 600 dots per inch (dpi). In this arrangement, each printhead prints half of the pixels in each row of an image.

One issue affecting image quality in imaging devices having serially arranged printheads is misalignment of the printheads. Misalignment may arise from errors in mounting two printheads, physical tolerances in the manufacture of printheads, or paper movement past the printheads. Misalignment may be observed in the failure of pixels from the two heads to be aligned in a row of drops generated by the two printheads. In areas of an image that are comprised of pixels of the same color having approximately the same ink density, this misalignment can be detected by the human eye. In four color or CYMK systems, the imaging device may include a pair of serially aligned printheads for each color. Misalignments between printheads may be quite detectable by the human eye at cross-process edges adjacent relatively uniform areas in an image. Cross-process edges are those edges of objects that are aligned in a direction that is perpendicular to the direction of relative motion during printing between the ink receiving material and the printheads. For example, the horizontal edges of characters in a line of text present cross-process edges to a viewer's eye. Consequently, systems able to compensate for the lack of registration in rows of drops ejected by serially arranged printheads in a color separation are desirable.

SUMMARY

A method processes image data for a color separation to reduce visible perception of misalignment of printheads in a plurality of serially arranged printheads. The method includes detecting cross-process edges in image values for objects in a color separation to be printed by a plurality of serially arranged printheads, and disproportionately mapping image values corresponding to the object in the color separation to one of the printheads in the plurality of serially arranged printheads.

The method may be performed by a system that renders image data for a color separation. The system includes a cross-process edge detector that detects object edges in image values of a color separation to be printed by a plurality of serially arranged printheads, a plurality of image arrays, one image array for each printhead in the plurality of serially arranged printheads, and an image value mapper configured to disproportionately map image values corresponding to an object in the color separation to one of the image arrays in response to a cross-process object edge being detected in the image values of the color separation.

BRIEF DESCRIPTION OF THE DRAWINGS

The foregoing aspects and other features of a printer that enables image values of a color separation to be printed with different combinations of serially arranged printheads are explained in the following description, taken in connection with the accompanying drawings.

DETAILED DESCRIPTION

Figure 1:
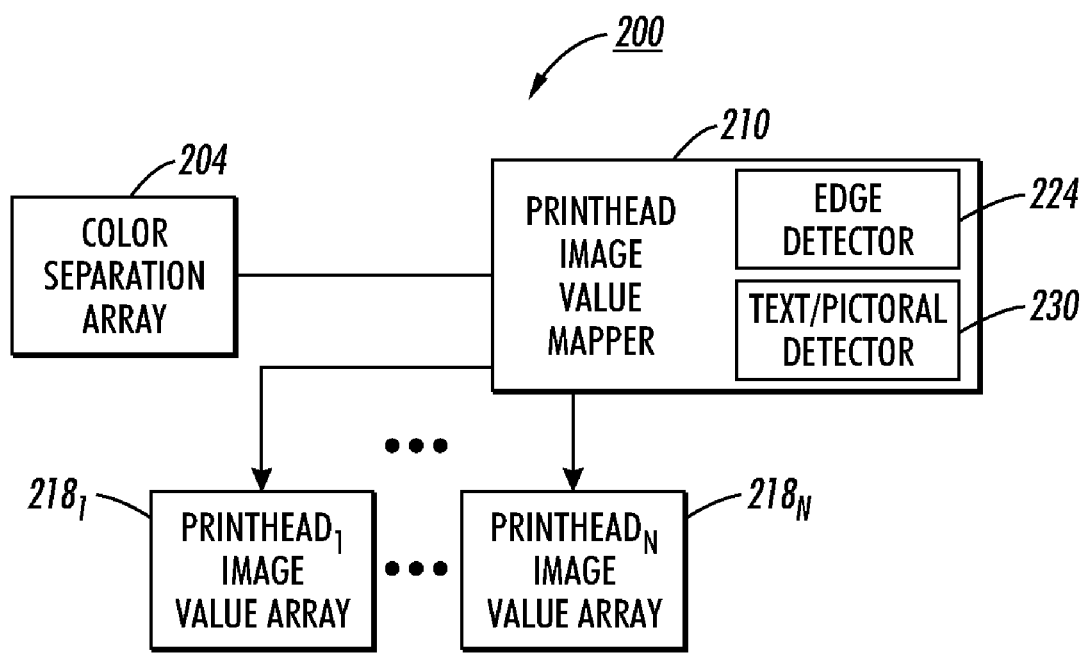
FIG. 1 is a block diagram of a system that processes input image values in a color separation to compensate for a lack of registration between serially arranged printheads.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, etc.

Figure 3:
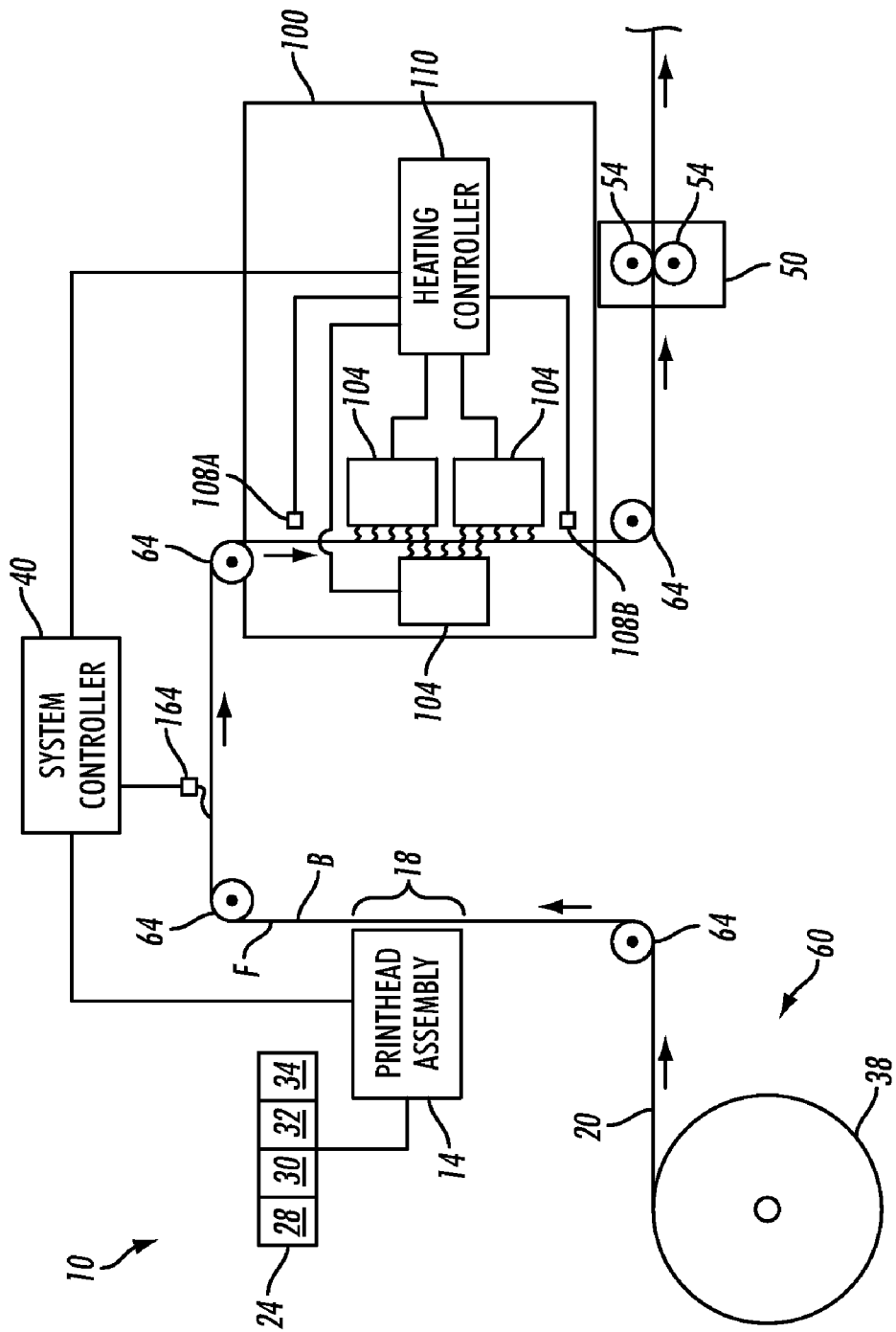
FIG. 3 is a block diagram of an inkjet printing system in which a system and method that process input image values for a color separation to be printed by serially arranged printheads may be used.

FIG. 3 depicts an imaging apparatus, or at least a portion of an imaging apparatus, 10 in which elements pertinent to the present disclosure are shown. In the embodiment shown, the imaging apparatus 10 implements a solid ink print process for printing onto a continuous media web. To this end, the imaging device 10 includes a web supply and handling system 60, a phase change ink printing system 16, and a web heating system 100. Although the image data processing system and method are described below with reference to the imaging system depicted in FIG. 1, the color separation processing system and method may be used in any imaging apparatus, such as a cartridge inkjet system, that uses serially arranged printheads to eject ink onto an image substrate.

As shown in FIG. 3, the phase change ink printing system includes a web supply and handling system 60, a printhead assembly 14, a web heating system 100, and a fixing assembly 50. The web supply and handling system 60 may include one or more media supply rolls 38 for supplying a media web 20 to the imaging device. The supply and handling system is configured to feed the media web in a known manner along a media pathway in the imaging device through the print zone 18, past the web heating system 100, and through the fixing assembly 50. To this end, the supply and handling system 60 may include any suitable device 64, such as drive rollers, idler rollers, tensioning bars, etc., for moving the media web through the imaging device. The system may include a take-up roll (not shown) for receiving the media web 20 after printing operations have been performed. Alternatively, the media web 20 may be fed to a cutting device (not shown) as is known in the art for cutting the media web into discrete sheets.

The printhead assembly 14 is appropriately supported to eject drops of ink directly onto the media web 20 as the web moves through the print zone 18. In other imaging systems in which the color separation processing system and method may be used, the printhead assembly 14 may be configured to eject drops onto an intermediate transfer member (not shown), such as a drum or belt, for subsequent transfer to a media web or media sheets. The printhead assembly 14 may have two or more printheads. Within each printhead, a plurality of inkjets is arranged in a row and column fashion. Each of the inkjets is coupled to a source of liquid ink and each one ejects ink through an inkjet nozzle in response to a firing signal being received by an inkjet actuator, such as a piezoelectric actuator, in the inkjet.

In the illustrated system of FIG. 3, the printhead assembly includes a plurality of printheads for printing full color images comprised of the colors cyan, magenta, yellow, and black. For example, the printhead assembly 14 in FIG. 3 may have eight printheads, two for each color of ink supplied by the solid ink supply 24. Each printhead has a predetermined inkjet density, which may be, for example, 300 dots per inch (dpi) in the cross-process direction. The two or more printheads for a particular color are serially arranged, which means that some of the printheads are located downstream in the direction of web movement from the other printheads that eject the same color of ink. The downstream printheads may be offset from the upstream printheads by an integral number plus zero to one-half of the inkjet spacing on a printhead. Thus, the serially arranged printheads enable one or more rows, depending upon the number of inkjet rows in the printheads, to be printed with a density that is twice the density of each single printhead. For example, two 300 dpi printheads offset by a distance of one-half of an inkjet spacing enable rows of 600 dpi to be printed, though the printheads need not be aligned to an integral number plus one-half of the inkjet spacing either by intention or by misalignment.

In the printing system shown in FIG. 3, ink is supplied to the printhead assembly from a solid ink supply 24. In aqueous or emulsion ink systems, which use the color separation processing system and method disclosed herein, however, the liquid ink may be stored in one or more volumetric containers installed in the printing system. Since the phase change ink imaging device 10 is a multicolor device, the ink supply 24 includes four sources 28, 30, 32, 34, representing four different colors CYMK (cyan, yellow, magenta, black) of phase change ink solid ink. The phase change ink system 24 also includes a solid phase change ink melting and control assembly or apparatus (not shown) for melting or phase changing the solid form of the phase change ink into a liquid form, and then supplying the liquid ink to the printhead assembly 14. Each color of ink is supplied to at least a pair of serially arranged printheads. The differently colored inks are supplied through separate conduits. A single line connects the ink supply 24 with the printhead assembly 18 in the figure to simplify the representation depicted in the figure. Operation and control of the various subsystems, components, and functions of the device 10 are performed with the aid of a controller 40.

In order to form an image with the ink ejected by the printhead assembly 14, image data are converted into firing signals that selectively actuate the inkjets in the printheads to eject ink onto the web as it moves past the printhead assembly. Typically, digital image data are received by the device 10. These digital image data may include an image for each color to be printed in the image. The input image data for a single color is called a color separation for the overall image. Each datum in a color separation corresponds to an input image value for a particular location in the color separation. In previously known systems having serially arranged printheads, all of the input image values for a color separation were equally distributed among the inkjets in the serially arranged printheads that correspond to a particular location in an image. For example, an input image value at a particular location in a color separation to be printed by two serially arranged printheads would be processed to generate an output image value for each printhead having an inkjet corresponding to that location in each of the serially arranged printheads. The output image values are then provided to a printhead controller that generates firing signals for each inkjet in each printhead that ejects ink for a color separation. The processing of the input image values in the color separations is typically performed by a marking engine, which is controlled by a processor executing instructions stored in a memory operatively coupled to the processor.

The processor for the marking engine may be one or more processors configured to perform the color separation processing described below. The processor may be a general purpose processor having an associated memory in which programmed instructions are stored. Execution of the programmed instructions enables the processor to process each ink density in a color separation differently for each printhead associated with a particular color. The processor may, alternatively, be an application specific integrated circuit or a group of electronic components configured on a printed circuit for operation of the independent processing of the ink densities for the two serially arranged printheads. Thus, the processor may be implemented in hardware alone, software alone, or a combination of hardware and software. In one embodiment, the processor for the marking engine that independently renders each portion of a color separation comprises a self-contained, microcomputer having a central processor unit (not shown) and electronic storage (not shown). The electronic storage may be a non-volatile memory, such as a read only memory (ROM) or a programmable non-volatile memory, such as an EEPROM or flash memory. The image data source may be any one of a number of different sources, such as a scanner, a digital copier, a facsimile device, etc.

Once the input image values have been used by the printhead controller to generate firing signals for the inkjets in the serially arranged printheads, drops of ink are ejected by the printhead assembly onto the moving web to form an image. The web continues to move so the image passes through a fixing assembly 50, which fixes the ink drops to the web. In the embodiment of FIG. 3, the fixing assembly 50 comprises at least one pair of fixing rollers 54 that are positioned in relation to each other to form a nip through which the media web is fed. The ink drops on the media web are pressed into the web and spread out on the web by the pressure formed by the nip. Although the fixing assembly 50 is depicted as a pair of fixing rollers, the fixing assembly may be any suitable type of device or apparatus, as is known in the art, which is capable of fixing, drying, or curing an ink image onto the media.

A block diagram of a system that processes the input image values of a color separation for each printhead in a group of serially arranged printheads is shown in FIG. 1. The system 200 includes a color separation array 204 in which a color separation from an image source is stored. The input image values of the color separation stored in the array 204 are processed and mapped by a printhead image value mapper 210 to one or more printhead image value arrays $218_1$ to $218_N$. The values in these arrays are used by a printhead controller (not shown) to generate firing signals for the printheads in a plurality of serially arranged printheads in a printhead assembly. The printhead image value mapper 210 also includes an edge detector 224 and a text/pictorial detector 230. The edge detector 224 detects cross-process edges in the image values of a color separation and the text/pictorial detector 230 classifies regions in a color separation as being a text character or a picture. The detection of cross-process edges, text characters, and pictures alter the mapping of image values as explained in more detail below.

In the embodiment shown in FIG. 1, an operator may select a mapping mode of operation for the printhead image value mapper. The various modes of operation are described below. Once the mapper mode of operation is selected, the mapper operates in accordance with this mode. If the operator selects another mode of operation, the printhead image value mapper is configured to operate in accordance with the newly selected mode until another operational mode is selected. In previously known printhead image value mappers, the image values are read from the array 204 and written to each printhead image value array based solely on a conventional one to one proportional mapping of the color separation to physical position of the inkjets of each printhead. For example, if the color separation array 204 had 600 pixels per inch and two series printheads of 300 pixels each formed a 600 pixel total, then every other pixel from the separation array 204 was passed to one head or the other head.

Proportional mapping and the resultant printing, however, may render misalignment between the two printheads visible, particularly at the edges of objects in a color separation. The operational modes now described have been developed to reduce the visibility of printhead misalignment at the edges of objects. In general, these operational modes disproportionately map image values from the color separation array 204 to the printhead image value arrays $218_1$ to $218_N$ so a single printhead image array receives image values that correspond to cross-process edges in the color separation and the other printhead image arrays receive none or at least fewer of the cross-process edge image values. This disproportional mapping results in a cross-process edge being printed mostly by a single printhead rather than a plurality of printheads offset from one another. As a consequence, the cross-process edge has a lower resolution in the cross-process direction than other portions of the image, however, misalignment within a printhead is rarely observable by a human eye. Thus, the edge appears cleaner and the loss of resolution is less objectionable than misalignments between printheads. The operational modes now discussed are variants of this general approach to cross-process edge printing.

This general mode of operation may be described as printing cross-process object edges with a single printhead in a plurality of serially arranged printheads, and printing image values in the color separation that are not cross-process edge image values and not image values within an object in the color separation with all of the printheads in the plurality of serially arranged printheads. This description requires a single printhead to print the cross-process edge image values and the remaining image values, except the image values within an object having a cross-process edge, are printed proportionately by all of the printheads in the plurality of serially arranged printheads. The image values within an object having cross-process edges may be printed in a number of different ways. In one operational mode, the image values within an object are printed with the single printhead that printed the cross-process edges of the object. During this mode of operation the speed of the image receiving member is also decreased to increase the resolution of the object in the process direction. For example, decreasing the speed of the image receiving member by half enables the single printhead to print two rows of ink drops where it could only print one at the higher speed. This type of operation allows drops that would have been printed by the second printhead to be printed on one of the intermediate rows of the first printhead. Thus, the decrease in resolution in the cross-process direction at the edges can be compensated by the increase in resolution in the process direction. So the overall image resolution of the object is maintained while visibility of printhead misalignment at the cross-process edges is attenuated.

In another mode of operation, the cross-process edges are printed with a single printhead and the image values within the object having the cross-process edge are printed with all of the printheads in the plurality of serially arranged printheads. Because the area within an object is typically fairly uniform, the misalignment is not as observable so proportional mapping and the resultant printing does not produce image quality issues as they do at the cross-process edges. In another mode of operation, only a predetermined percentage of image values within the object having the cross-process edge are printed with all of the printheads in the plurality of serially arranged printheads. This mode of operation helps attenuate the resolution difference between the portion of the object near a cross-process edge and the cross-process edge. The predetermined percentage may be in a range of about fifty percent of all of the image values within the object to about one hundred percent of all of the image values within the object, although lower percentages may be used.

In another mode of operation, the cross-process edges of textual characters and pictures or graphics are printed differently. For example, image values within textual objects in the color separation may be printed with a single printhead, while image values within pictorial objects in the color separation are printed with all of the printheads in the plurality of serially arranged printheads. This mode of operation enables the pictorial objects to maintain a consistent resolution across the object, while still providing sharper edges for textual characters where misalignment is perhaps most observable.

In the following discussion, the reader should appreciate that a cross-process edge may be one or more pixels deep in the process direction. In fact, the depth of a cross-process edge may be selected to be as extensive as necessary in the process direction to exceed an expected length of process direction misalignments between printheads.

Figure 2:
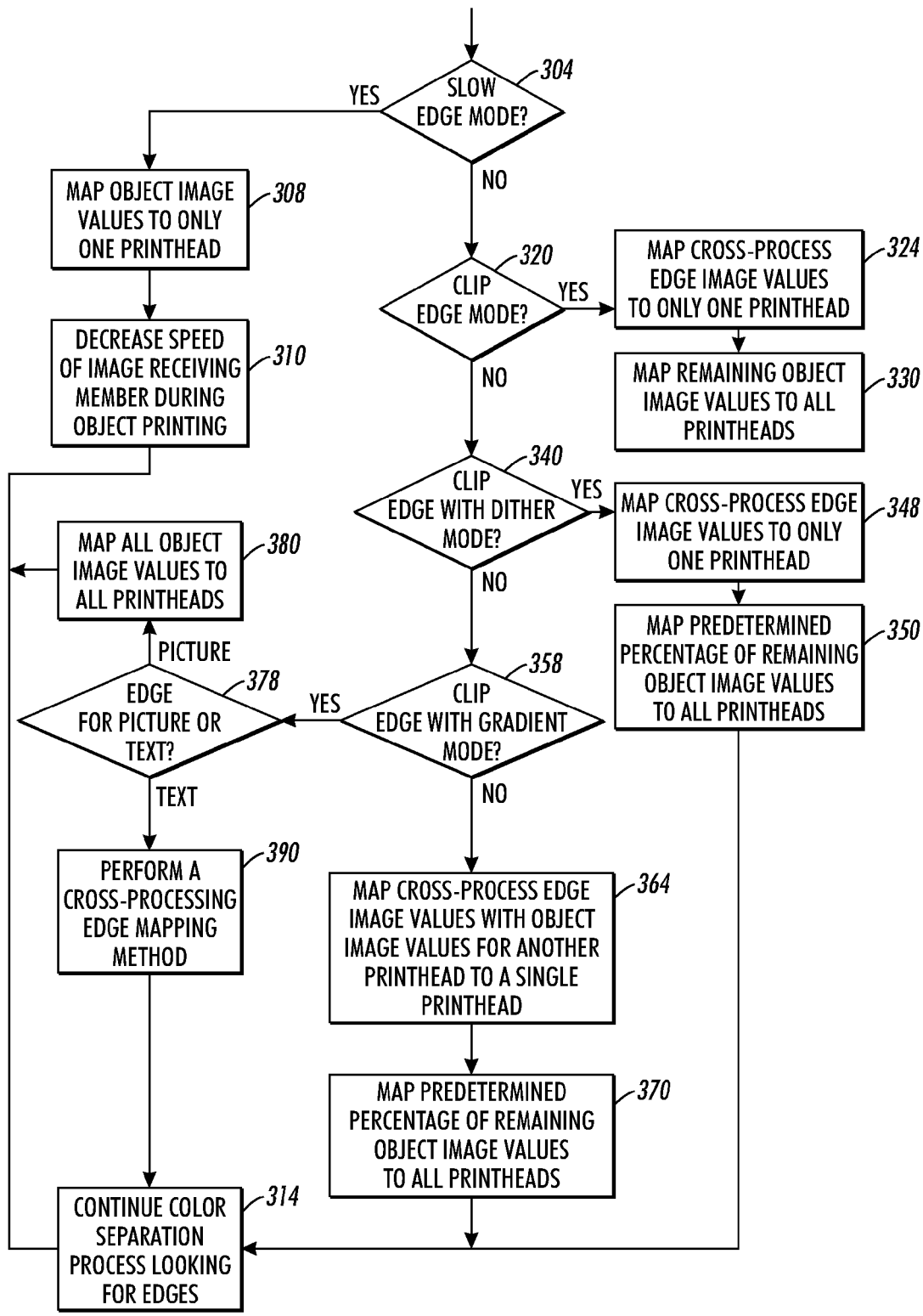
FIG. 2 is a flow diagram of a method that maps image values for cross-process edges in a color separation to printheads differently than other image values to compensate for a lack of registration between serially arranged printheads.

A flow diagram of a method for implementing these various modes of operation is shown in FIG. 2. Prior to entry into this method, a cross-process edge has been detected in a color separation. In response to this detection, either all edges have been determined to be corrected, the detected edge has been identified as being textual, or otherwise identified as an edge to be corrected. Then one of the cross-process edge operational modes is activated. For example, in a web printing process, the process direction is in the direction in which the web moves past the printheads and the cross-process direction is across the web. This orientation is sometimes referenced as columns of an image in the process direction, while the cross-process image may be understood to correspond to the rows of an image. The cross-process edges may be detected by the cross-process edge detector 224 as the printhead image value mapper 210 reads image values from the color separation array 204 or the entire color separation array may be processed by the edge detector 224 before the mapping process begins. Detection of cross-process edges using filters, thresholds, and the like is well-known within the image processing art. The edge detector 224 uses these known techniques to identify cross-process edges in a color separation.

Once a cross-process edge has been detected and a cross-process operational mode activated, the process shown in FIG. 3 begins by determining the active cross-process edge operational mode. If it is the slow print mode (block 304), the printhead image value mapper maps the image values for the object having the detected cross-process edge to one of the arrays for one of the serially arranged printheads predominantly (block 308). The speed of the image receiving member is also decreased during the printing of the object (block 310). Processing of image values continues without reference to the operational mode until the next cross-process edge is detected (block 314). If the clip edge mode is active (block 320), the printhead image value mapper maps the image values for the cross-process edges in the object to one of the arrays for the serially arranged printheads predominantly (block 324). The remaining image values for the object are mapped to all of the printhead arrays in a proportionate manner (block 330). Processing of image values continues without reference to the operational mode until the next cross-process edge is detected (block 314).

Continuing with reference to FIG. 2, detection of a clip edge with dither mode (block 340), causes the printhead image value mapper to map the image values for the cross-process edges in the object to one of the arrays for the serially arranged printheads predominantly (block 348). A predetermined percentage of the remaining image values for the object are mapped to all of the printhead image value arrays (block 350). The predetermined percentage may be in the range of about fifty percent (50%) to about one hundred percent (100%) of the remaining object image values. Processing of image values continues without reference to the operational mode until the next cross-process edge is detected (block 314). In response to detection of a clip edge with gradient dither mode (block 358), the printhead image value mapper maps the cross-process edge image values to a single printhead predominantly along with a predetermined percentage of the next row of object image values to be printed by another printhead in the plurality of printheads (block 364). For cross-process edges at a bottom edge of an object, the next row is the preceding row in the object. The movement of the next row of image values from one of the printheads not used for cross-process edge printing may be called shifting. A predetermined percentage of the remaining image values for the object that are not cross-process edge image values are mapped to all of the printheads (block 370). Processing of image values continues without reference to the operational mode until the next cross-process edge is detected (block 314).

If none of the previously discussed operational modes are active, the text/pictorial mode is active. In this mode, the process determines whether a detected edge is associated with a textual character region or a picture/graphic region (block 378). If the object is a picture, then all of the object image values, including the cross-process edge image values, are mapped to all of the printheads (block 380). Otherwise, one of the operational modes for cross-process edges described above is performed for the textual object (block 390). The cross-process edge processing is selected at the time that the text/pictorial mode is selected, which as noted above, occurs before a cross process edge operational mode is selected. Processing of image values continues without reference to a cross process edge operational mode until the next cross-process edge is detected (block 314).

In operation, a printing system as shown in FIG. 3 is modified to perform a method as shown in FIG. 2. An operator activates a menu and selects an operational mode for the cross-process edge processing. As images are separated into color images, the printhead image value mapper either proportionately maps image values to all of the printheads in a plurality of serially arranged printheads or, in response to cross-process edge detection, it disproportionately maps image values to the printheads. The disproportionate mapping enables the printheads to print cross-process edges with less resolution, but better fidelity to cross-process alignment. If the text/pictorial mode is selected, the image values for graphical or pictorial objects are mapped to all of the printheads, while the image values for textual objects are mapped in one of the disproportionate mappings discussed above.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for processing image data for a color separation comprising:

detecting cross-process edges in image values for objects in a color separation, a portion of the color separation to be printed by each printhead in a plurality of serially arranged printheads, each printhead in the plurality of serially arranged printheads that prints a portion of the color separation being configured to eject a same color of ink to print the color separation;

detecting an operational mode in response to a detection of a first cross-process edge in the image values;

mapping the image values corresponding to an object having the detected cross-process edge to only one printhead in the plurality of serially arranged printheads that eject the same color of ink in response to a first operational mode being detected;

mapping the image values corresponding to the detected cross-process edge to only one printhead in the plurality of serially arranged printheads that eject the same color of ink and mapping an equal proportion of the image values remaining for the object having the detected cross-process edge to each printhead in the plurality of printheads that eject the same color of ink in response to a second operational mode being detected;

mapping the image values corresponding to the detected cross-process edge to only one printhead in the plurality of serially arranged printheads that eject the same color of ink and mapping an equal proportion of a predetermined percentage of the image values remaining for the object having the detected cross-process edges to each printhead in the plurality of printheads that eject the same color of ink in response to a third operational mode being detected; and repeating the detection of the operational mode and the corresponding mapping for the detected operational mode for each cross-process edge detected in the image values until all cross-process edges in the image values have been detected.

2. The method of claim 1 further comprising:

slowing a speed of an image receiving member past the serially arranged printheads that prints the color separation as the image values mapped to the single printhead in response to the detection of the first operational mode are used to generate firing signals for the single printhead.

3. A method for processing image data for a color separation comprising:

detecting cross-process edges in image values for objects in a color separation, the color separation to be printed by a plurality of serially arranged printheads, each printhead in the plurality of serially arranged printheads that prints a portion of the color separation being configured to eject a same color of ink to print the color separation;

mapping approximately all of the image values for the cross-process edges in the detected objects to a single printhead in the plurality of serially arranged printheads that prints the color separation;

mapping to the single printhead a predetermined percentage of a next row of image values for the detected objects to be printed by other printheads in the plurality of serially arranged printheads that prints the color separation; and mapping another predetermined percentage of the remaining image values for the detected objects to all of the printheads in the plurality of serially arranged printheads that prints the color separation, the other predetermined percentage being different than the predetermined percentage mapped to the single printhead.

4. The method of claim 3 wherein the predetermined percentage is in a range of approximately fifty percent to approximately one hundred percent of the image values.

5. The method of claim 1 further comprising:

detecting pictorial regions in image values for a color separation;

detecting text regions in the image values for the color separation;

mapping image values corresponding to objects in the text regions with reference to one of the first operational mode, the second operational mode, and the third operational mode being detected after the text region is detected; and proportionately mapping image values corresponding to objects in the pictorial regions to all of the printheads in the plurality of serially arranged printheads that print the color separation.

* * * * *